United States Patent Office 3,100,234
Patented Aug. 6, 1963

3,100,234
DEHYDROGENATION CATALYST
Emerson H. Lee, Texas City, Tex., assignor to Monsanto Chemical Company, St. Louis, Mo., a corporation of Delaware
No Drawing. Filed May 22, 1961, Ser. No. 111,428
15 Claims. (Cl. 260—669)

The present invention relates to the dehydrogenation of organic compounds. More particularly, it relates to an improved process for the dehydrogenation of alkyl aromatic hydrocarbons such as ethylbenzene to vinyl aromatic hydrocarbons such as styrene and to an improved iron oxide catalyst therefor.

In view of its utility in the production of plastics, styrene has achieved considerable industrial importance. It can be polymerized with various comonomers to produce a variety of synthetic rubbers and to yield resins which are suitable for manufacturing numerous articles of commerce by casting, compressing, molding, and the like. Besides being useful with other polymerizable materials, styrene can be homopolymerized to produce polystyrene, one of the most widely used synthetic resins.

It is well known that styrene is produced commercially by the catalytic dehydrogenation of ethylbenzene. The process is usually carried out by passing ethylbenzene and a relatively large proportion of steam, for example, 2-30 mols of steam per mol of hydrocarbon, over a bed of a suitable catalyst at elevated temperatures. The catalysts used in the process usually contain as a primary active constituent certain metals of groups IV to VIII of the periodic table either in their free form or, preferably, in the form of various of their compounds such as the oxides, sulfides, phosphates, etc. Generally, mixtures of two, three, or more of such compounds are employed. Some of these catalysts, however, are characterized by certain disadvantages such as low conversion and/or selectivity of reaction, poor physical strength, short catalyst life, and necessity for frequent regeneration. Typical catalysts which have been found to have a minimum of these disadvantages are alkalized iron oxide catalysts wherein an alkali metal compound is employed as a promoter, said promoter being usually a compound of potassium. These catalysts are autoregenerative under conditions at which the dehydrogenation reaction is carried out, that is, they are capable of being continually regenerated under the conditions of the reaction. This obviates the necessity for interrupting the process and regenerating the catalyst, a procedure which includes burning the carbon deposits off the surface of the catalyst particles, as is required with other dehydrogenation catalysts. While these catalysts are generally suitable and widely used because of the above-mentioned advantages as they are currently employed in the art, they do not provide for maximum activity and/or maximum mol percent selectivity of reaction.

In the catalytic dehydrogenation process, both toluene and benzene are produced simultaneously with styrene. The production of benzene poses no particular problem since this compound can be readily recycled in most commercial plants because in the usual processes for preparing the ethylbenzene, benzene is alkylated either with ethylene, an alkyl chloride, or an alcohol. Toluene, however, is not reusable in the over-all styrene process. It is simply a by-product and, depending upon prevailing market conditions, may prove to be a costly one. Any change in the composition or manner of preparing the catalyst which may result in a decrease in its selectivity to toluene in the reaction at various conversion rates and reduce production of this by-product to a minimum can be extremely significant economically and is, therefore, highly advantageous.

It is an object of the present invention, therefore, to provide an improved process for dehydrogenation of alkyl aromatic hydrocarbons such as styrene. More specifically, it is an object of the present invention to control the process for dehydrogenation of ethylbenzene to styrene so that the least possible amount of toluene will be produced while the maximum yield of styrene is being attained. These and other objects of the invention which will become apparent from the following description and appended claims are accomplished by the use of iron oxide catalyst containing a mixed or composite promoter wherein one of the essential constituents is a potassium compound and the other is a compound of a metal chosen from the group consisting of sodium, lithium, barium, magnesium, and calcium. The novel catalyst of this invention, thus, is a formulation comprising iron oxide as the active catalytic agent promoted with a mixture of a potassium compound and a compound of a metal chosen from the group consisting of sodium, lithium, barium, magnesium, and calcium. Suitable compounds of potassium as well as the other metals recited include the oxides, hydroxides, carbonates, bicarbonates, nitrates, phosphates, borates, acetates, and the like, with the oxides and carbonates being preferred. Other components may be present in addition to the active iron oxide component and the promoter mixture, such as stabilizers, diluents, binders, and the like.

The catalyst of this invention contains iron oxide as the predominating active dehydrogenating constituent. A convenient and economical source of iron oxide is in the form of commercial pigments which are of uniform purity and particle size. However, iron oxides may also be prepared by the thermal decomposition of iron compounds such as ferric nitrate, ferric oxalate, and the like or by precipitation from solutions of iron salts such as ferric nitrate, ferrous sulphate, etc., followed by thermal decomposition. Generally, however, the latter procedures do not produce an oxide of uniform characteristics and high purity at a cost competitive with that of commercial pigments. The concentration of the iron oxide in the finished catalyst may vary over a wide range. The catalyst should contain on a finished basis at least about 35% by weight of iron oxide. Preferably, the concentration of iron oxide is maintained in the range from about 45% to about 95% by weight.

It is essential that the iron oxide be alkalized by incorporation of a promoter which, according to this invention, is a composite promoter, specifically, a mixture of a compound of potassium and a compound of a metal chosen from the group consisting of sodium, lithium, barium, magnesium, and calcium. The composite promoter may be used in relatively small amounts, that is, from about 0.5% by weight of the total catalyst up to 50% by weight or more of the catalyst. A preferred range is between about 5% and 35% by weight of the catalyst. The composite promoter must contain at least 1% by weight of the total catalyst composition of the potassium compound and the weight ratio of the second metal compound to the potassium compound must be maintained within the range from about 1:1 to about 5:1. Preferably, this ratio is maintained in the range from about 1:1 to 2:1. Since under the calcining conditions employed these metal compounds are converted to the oxides, all weight percents are calculated on the basis of the oxide.

As indicated above, other ingredients may be present or not, as desired in the catalyst composition. Heavy metal oxides more difficulty reducible than iron oxide which function as stabilizers can be included, for example. These metal compounds may be incorporated per se in the catalyst or they may be formed therein during the catalyst preparation from primary compounds such as the hydroxides, carbonates, nitrates, and the like. The concentration of such stabilizers is not critical. Only small amounts are required. Chromium oxide is the preferred stabilizer and this compound is generally employed in amounts from about 1% to about 5% by weight. Diluent materials such as alumina, zirconia, beryllia, and asbestos can also be incorporated in the catalyst as can binding agents such as silicates, cement, kaolin, and the like which impart structural stability to the catalyst composition.

The method of preparation of the catalyst is not critical. For example, the separate components may be ball-milled or otherwise mixed with a small amount of water, formed into pellets and dried. Small amounts of extrusion aids may also be incorporated into the paste. For example, 0.1 to 0.2% of such materials as stearic acid, hydrogenated cottonseed oil, tannic acids, or tannins may be added to modify the rheological properties of the mixture to aid in extrusion into pellets. Catalysts may also be prepared by means of a coprecipitation of solutions of reagents wherein the precipitate is convertible to the desired components of the catalyst or by impregnating the iron oxides with the other components.

Also uncritical are the shape and size of the catalyst particles. For example, the catalyst may be in the form of pellets, powder, pills, tablets, spheres, saddles, etc. Symmetrical pellets of $\frac{1}{50}$ inch to $\frac{3}{4}$ inch in diameter and $\frac{1}{16}$ inch to 1 inch in length are considered very satisfactory. It has been found that calcination of the iron oxide either prior to or subsequent to mixing with the other components for at least one hour and preferably for several hours at a temperature of 500° to 1050° C. and preferably from 600° to 900° C. is usually beneficial to the activity of the catalyst.

The dehydrogenation of ethylbenzene is carried out in the vapor phase at temperatures above about 580° C. and preferably between 600° C. and 700° C. Somewhat higher temperatures up to about 800° C. can be used but are generally less suitable. The dehydrogenation may be effected at any desired pressure. However, the partial pressure of the hydrocarbon reactant in the reaction zone is preferably not more than about one atmosphere. The low pressure of the reactant may be obtained by operating under diminishing pressure or by the use of a diluent while operating at normal pressure or at superatmospheric pressure. Steam is a particularly good diluent in most cases and is preferably employed in large amounts, for example, between 2 and 30 mols of steam per mol of hydrocarbon feed. Contact time is adjusted by the rate of flow to afford the desired degree of conversion. In general, flow rates of reactant corresponding to gaseous hourly space velocities (measured at standard conditions) between about 300 and 3000 may be employed.

The invention is illustrated in the following example which, however, is not to be construed as limiting it except as it is limited in the appended claims.

EXAMPLE

A group of catalysts designated as catalysts 1-11, inclusive, were prepared by mixing iron oxide and the nitrates of potassium, sodium, lithium, barium, magnesium, and calcium or mixtures thereof, respectively, in various proportions into a paste with water. The mixtures were dried, activated by heating at 900° C. for 2-4 hours and then ground up into irregular granules to pass a 20-30 mesh screen (U.S. Sieve Series). The compositions of the finished catalysts were as follows:

(1) $Fe_2O_3 + 5\% Na_2O$
(2) $Fe_2O_3 + 5\% K_2O$
(3) $Fe_2O_3 + 10\% Na_2O + 5\% K_2O$
(4) $Fe_2O_3 + 3\% Li_2O$
(5) $Fe_2O_3 + 5\% Li_2O + 5\% K_2O$
(6) $Fe_2O_3 + 10\% MgO$
(7) $Fe_2O_3 + 5\% MgO + 5\% K_2O$
(8) $Fe_2O_3 + 5\% CaO$
(9) $Fe_2O_3 + 5\% CaO + 5\% K_2O$
(10) $Fe_2O_3 + 14\% BaO$
(11) $Fe_2O_3 + 5\% BaO + 5\% K_2O$

Catalyst 12 was prepared by admixing iron oxide, chromium oxide, potassium carbonate, and calcium silicate in a slurry with water, extruding the plastic mass formed through a $\frac{1}{8}$-inch die to produce pellets, drying the pellets, and then calcining them at about 600° to 700° C. for several hours. The pellets were then crushed to provide catalyst particles approximately $\frac{1}{50}$ inch in diameter. The finished catalyst had a composition as follows:

| | Percent |
|---|---|
| $Fe_2O_3$ | 45 |
| $Cr_2O_3$ | 5 |
| $K_2CO_3$ | 25 |
| Calcium silicate | 25 |

Catalyst 13 was prepared in the same manner as catalyst 12 except that sodium carbonate was added as well as potassium carbonate to the admixture. The composition of this finished catalyst was as follows:

| | Percent |
|---|---|
| $Fe_2O_3$ | 45 |
| $Cr_2O_3$ | 5 |
| $K_2CO_3$ | 5 |
| $Na_2CO_3$ | 4 |
| Calcium silicate | 21 |

A series of tests were conducted utilizing the prepared catalysts. The selectivities of all of the catalysts were determined in a differential reactor consisting of a 20-mm. O.D. quartz tube shielded by a stainless steel jacket and heated by means of a tube furnace. The catalyst pellets of known weight (1-10 g.) were placed in a quartz boat about 100 mm. x 15 mm. disposed within the reactor, a 60-mesh stainless steel screen being used to support the samples. Catalyst beds were only one or two pellets in depth in order to eliminate apparent differences in catalyst activity caused by the limited rate of diffusion of gases through the bed.

The reactor was heated and steam was passed through it overnight to remove air from the system. Ethylbenzene (99.5 to 99.7% purity) with steam in a weight ratio of steam to ethylbenzene of 2.2 to 1 was passed through the reactor at a rate of 30 g. per hour, a pressure of one atmosphere and at a temperature in the range of about 600° C. over a reaction period of 8 hours. Temperatures were recorded by means of thermocouples located within the reactor.

The effluent gas passed from the reactor into a water-cooled condenser and the condensate was collected in a receiving flask. Noncondensible gas was passed through a wet-test meter and vented after measurement. Samples of the organic condensate were analyzed for styrene, benzene, and toluene with precautions being taken to prevent any loss of benzene and toluene from the sample. Low levels of conversion to styrene (1-8%) were maintained throughout the experiment in order to remain in the differential range and to assure that any effects would be only those attributable to the catalyst. Selectivity of each catalyst tested for styrene and toluene is recorded in Table I. Selectivity is defined as follows:

$$\text{Selectivity} = \frac{\text{Styrene (or toluene)}}{\text{Styrene} + \text{benzene} + \text{toluene}} \times 100$$

All selectivity data given are for the catalytic reaction only, corrections based on experimental determination having been made for any thermal reaction occurring.

Table I

| Catalyst No. | Selectivity | |
|---|---|---|
| | To styrene, percent | To toluene, percent |
| 1 | 86.1 | 0.05 |
| 2 | 96.3 | 2.1 |
| 3 | 97.4 | 1.3 |
| 4 | 66.7 | 0.08 |
| 5 | 96.0 | 1.3 |
| 6 | 70.0 | 0.8 |
| 7 | 96.2 | 1.6 |
| 8 | 79.5 | 0.3 |
| 9 | 97.3 | 1.6 |
| 10 | 74.4 | 0.4 |
| 11 | 95.9 | 1.0 |
| 12 | 97.2 | 1.8 |
| 13 | 97.9 | 1.1 |

It is readily apparent from the data that the use of the mixed promoter of the invention effectively reduces the amount of by-product toluene made in the dehydrogenation system and accordingly increases the efficiency of the over-all styrene process.

In addition to its utility in the dehydrogenation of ethylbenzene to styrene, the catalyst of the invention is applicable for dehydrogenation of various other aromatic hydrocarbons having an alkyl side chain of at least 2 carbon atoms such as, for example, propylbenzene, diethylbenzene, ethyltoluene, propyltoluene, ethylnaphthlene, diethylnaphthalene, diethyl diphenyl, and the like. Likewise, the catalysts of the invention are suitable for use in the production of diolefins by dehydrogenation of mono-olefins having at least four non-quaternary carbon atoms in a straight chain. They are particularly useful, for example, in the production of butadiene from butylene and are also applicable and advantageous for the production of other diolefins and particularly conjugated diolefins such as piperylene, isoprene, the various hexadienes, and the like from the corresponding mono-olefins.

What is claimed is:

1. A process for the dehydrogenation of ethylbenzene which comprises contacting ethylbenzene in the presence of steam under dehydrogenation conditions with a catalyst comprising iron oxide as the active catalytic agent and a composite promoter therefor consisting of a mixture of a compound of potassium and a compound of a metal chosen from the group consisting of sodium, lithium, barium, magnesium, and calcium wherein the amount of said potassium compound in said composite promoter is at least 1% by weight of the total catalyst composition and the weight ratio of said remaining metal compound to said potassium compound is from about 1:1 to about 5:1.

2. The process of claim 1 wherein said composite promoter is present in an amount from about 5% to about 35% by weight of the total catalyst composition.

3. The process of claim 2 wherein said potassium compound in said composite promoter is potassium oxide and said remaining metal compound is an oxide of a metal chosen from the group consisting of sodium, lithium, barium, magnesium, and calcium.

4. The process of claim 2 wherein said composite promoter is a mixture consisting of 5% by weight of the total catalyst composition of potassium oxide and 10% by weight of the total catalyst composition of sodium oxide.

5. The process of claim 2 wherein said composite promoter is a mixture consisting of 3% by weight of the total catalyst composition of lithium oxide and 5% by weight of the total catalyst composition of potassium oxide.

6. A process for the dehydrogenation of ethylbenzene which comprises contacting ethylbenzene in the presence of steam under dehydrogenation conditions with a catalyst comprising from about 45% to about 60% by weight of iron oxide, from about 1% to about 5% by weight of chromium oxide, from about 5% to about 35% by weight of a composite promoter consisting of a mixture of a compound of potassium and a compound of a metal chosen from the group consisting of sodium, lithium, barium, magnesium, and calcium wherein the amount of said potassium compound is at least 1% by weight of the total catalyst composition and the weight ratio of said remaining metal compound to said potassium compound is maintained from about 1:1 to about 5:1 and from about 1% to about 25% of a calcium silicate binder.

7. The process of claim 6 wherein said potassium compound is potassium carbonate.

8. A process for dehydrogenation of ethylbenzene which comprises contacting ethylbenzene in the presence of steam under dehydrogenation conditions with a catalyst comprising 45% iron oxide, 5% chromium oxide, 4% potassium carbonate, 21% sodium carbonate, and 25% calcium silicate.

9. A catalyst for effecting the dehydrogenation of ethylbenzene in the presence of steam comprising iron oxide as the active catalytic agent and from about 5% to about 35% by weight of the total catalyst composition of a composite promoter therefor consisting of a mixture of a compound of potassium and a compound of a metal chosen from the group consisting of sodium, lithium, barium, magnesium, and calcium wherein the amount of said potassium compound in said composite promoter is at least 1% by weight of the total catalyst composition and the weight ratio of said remaining metal compound to said potassium compound is maintained from about 1:1 to about 5:1.

10. The catalyst of claim 9 wherein said potassium compound in said composite promoter is potassium oxide and said remaining metal compound is an oxide of a metal chosen from the group consisting of sodium, lithium, barium, magnesium, and calcium.

11. The catalyst of claim 9 wherein said composite promoter is a mixture consisting of 5% by weight of the total catalyst composition of potassium oxide and 10% by weight of the total catalyst composition of sodium oxide.

12. The catalyst of claim 9 wherein said composite promoter is a mixture consisting of 3% by weight of the total catalyst composition of lithium oxide and 5% by weight of the total catalyst composition of potassium oxide.

13. A catalyst for effecting the dehydrogenation of ethylbenzene in the presence of steam comprising from about 45% to about 60% by weight of iron oxide, from about 1% to about 5% by weight of chromium oxide, from about 5% to about 35% by weight of a composite promoter consisting of a mixture of a compound of potassium and a compound of a metal chosen from the group consisting of sodium, lithium, barium, magnesium, and calcium wherein the amount of said potassium compound is at least 1% by weight of the total catalyst composition and the weight ratio of said remaining compound to said potassium compound is maintained from about 1:1 to about 5:1, and from about 1% to about 25% of a calcium silicate binder.

14. The catalyst of claim 13 wherein said potassium compound is potassium carbonate.

15. A catalyst for effecting the dehydrogenation of ethylbenzene in the presence of steam under dehydrogenation conditions comprising 45% iron oxide, 5% chromium oxide, 4% potassium carbonate, 21% sodium carbonate, and 25% calcium silicate.

References Cited in the file of this patent

UNITED STATES PATENTS 2,813,137    Twaddle et al. _____ Nov. 12, 1957
2,851,502    Bowman et al. _____ Sept. 9, 1958

UNITED STATES PATENT OFFICE
CERTIFICATE OF CORRECTION

Patent No. 3,100,234                               August 6, 1963

Emerson H. Lee

It is hereby certified that error appears in the above numbered patent requiring correction and that the said Letters Patent should read as corrected below.

Column 2, line 8, for "styrene" read -- ethylbenzene --; line 16, for "catalyst" read -- catalysts --; column 3, line 6, for "difficulty" read -- difficultly --; column 5, line 31, for "ethylnaphthlene" read -- ethylnaphthalene --.

Signed and sealed this 28th day of January 1964.

(SEAL)
Attest:

ERNEST W. SWIDER

Attesting Officer

EDWIN L. REYNOLDS

Acting Commissioner of Patents